(No Model.)

F. W. DOVE.
MILLSTONE DRESS.

No. 267,502. Patented Nov. 14, 1882.

WITNESSES:
Frances McArdle,
C. Sedgwick

INVENTOR:
F. W. Dove
BY Munn & Co
ATTORNEYS.

UNITED STATES PATENT OFFICE.

FREDRICK W. DOVE, OF JONESBOROUGH, TENNESSEE.

MILLSTONE-DRESS.

SPECIFICATION forming part of Letters Patent No. 267,502, dated November 14, 1882.

Application filed September 15, 1882. (No model.)

*To all whom it may concern:*

Be it known that I, FREDRICK W. DOVE, of Jonesborough, in the county of Washington and State of Tennesse, have invented a new and Improved Millstone-Dress, of which the following is a full, clear, and exact discription.

My invention consists in an improved dress for millstones for flouring, consisting of a novel form of the furrows adapted to cause a free passage of the grain between and of the chop from between the stones.

Reference is to be had to the accompanying drawings, forming part of this specification, in which similar letters of reference indicate corresponding parts in both the figures.

Figure 1:
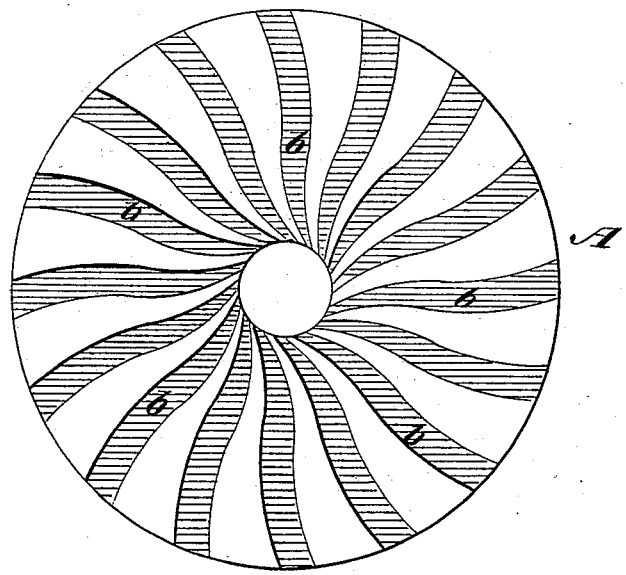
Figure 2:
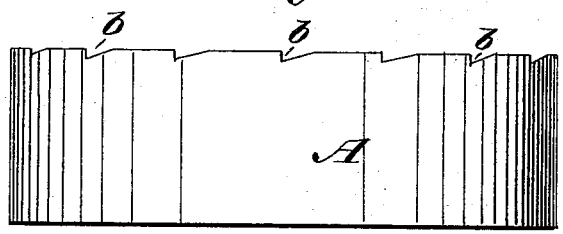

Figure 1 is a face view of a bed-stone dressed in correspondence with my invention. Fig. 2 is a side view of the same.

On the face of the stone A are formed the furrows *b*, which extend from the eye of the stone to the rim. From the eye the forrows first curve for about one-third of their length in a direction to facilitate the passage of the grain from the eye and in a direction to reduce the draft from the starting-point, and then curve in the opposite direction to increase the draft toward the skirt of the stone, as shown in Fig. 1. The furrows are comparatively narrow at the eye and widen gradually, so that they obtain their full width at about half the distance between the eye and the rim. Cross-sectionally they are formed at one side with an abrubt or cutting edge and at the other side are beveled gradually to the face of the stone. Both the bed-stone and the runner are to be dressed in the same form. In operation the furrows act to crush the grain immediately upon its entry between the stones, and the grain is floured upon the lands between the furrows. The operation will be equal throughout, as there are no short furrows, and the flour will be of superior quality and will not require regrinding.

Having thus described my invention, I claim as new and desire to secure by Letters Patent—

The millstone-dress consisting of reversely-curved furrows *b*, extending from the eye to the rim of the stone, substantially as shown and described.

FREDRICK W. DOVE.

Witnesses:
   A. R. PIPER,
   S. T. SHIPLEY, Jr.